Sept. 20, 1938.   R. C. MUIR   2,130,894
AUTOMATIC TEMPERATURE REGULATION
Filed June 24, 1936
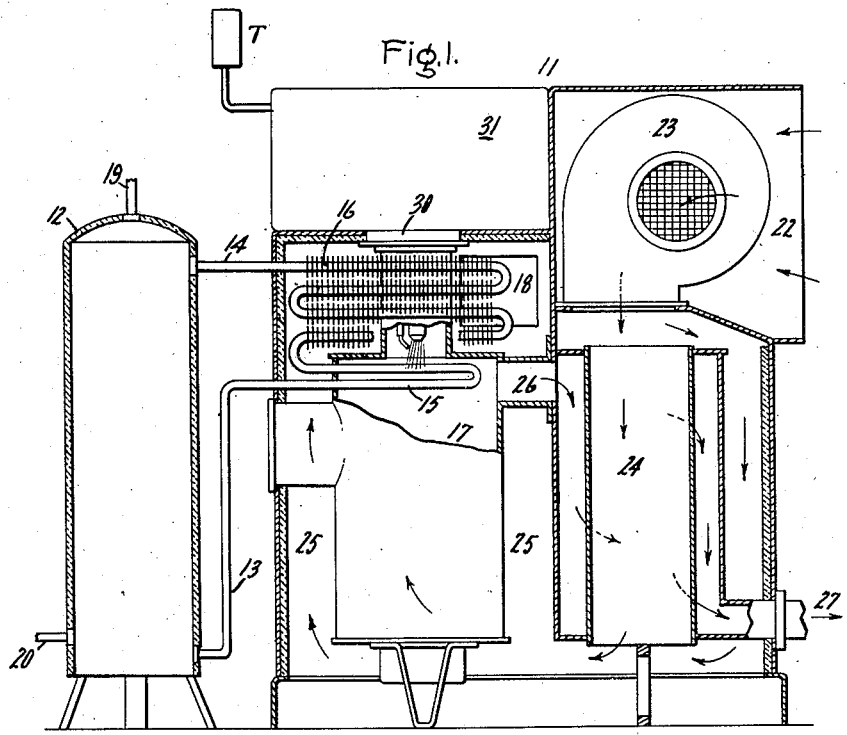
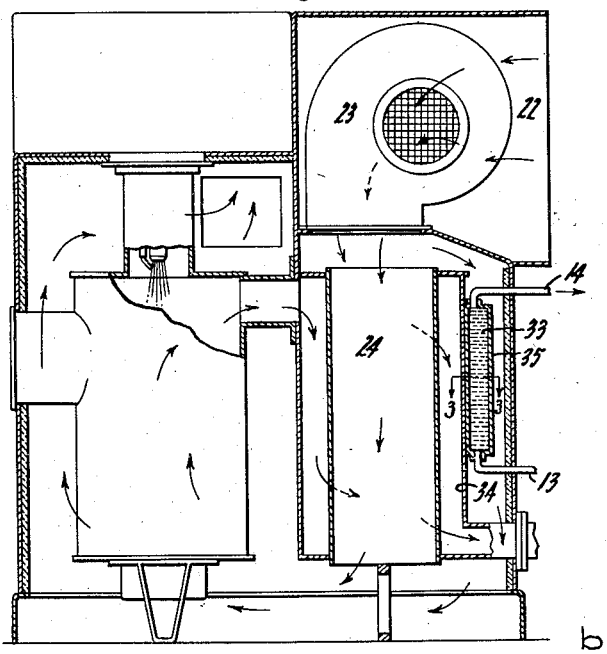
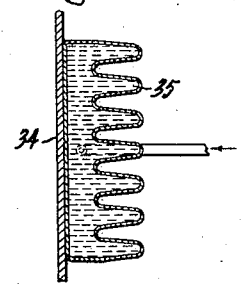
Inventor:
Roy C. Muir,
by Harry E. Dunham
His Attorney.

Patented Sept. 20, 1938

2,130,894

UNITED STATES PATENT OFFICE 2,130,894

AUTOMATIC TEMPERATURE REGULATION

Roy C. Muir, Schenectady, N. Y., assignor to General Electric Company, a corporation of New York Application June 24, 1936, Serial No. 86,961

3 Claims. (Cl. 126—101)

My invention relates to a novel method and means of automatic temperature regulation for a domestic hot water heating system in a thermostatically controlled warm air house heating furnace which prevents the temperature of the water in the domestic hot water storage tank from rising beyond a predetermined maximum value.

It is a primary object of my invention to provide novel method and means for obtaining a supply of domestic hot water from a warm air domestic heating furnace. More specifically, it is an object of my invention to provide a domestic hot water supply system requiring no movable parts, thermally controlled mechanism and the like to keep the temperature of the water below a predetermined maximum safe value even though the furnace be operated continuously under maximum heating conditions and no water withdrawn from the system.

At present there is need for a simple, inexpensive, and satisfactory system for obtaining a supply of domestic hot water from an oil fired or gas fired forced circulation warm air domestic heating furnace operating under a variable heating load. Furnaces of this type are operated ordinarily under thermostatic control in response to heat demands and because of wide variations in demand they are operated practically continuously in cold weather when the heating load is the maximum and for only a very small percentage of the time in mild weather when the heating load is the minimum. The heat absorbed from such a furnace by any ordinary type of heater for the supply of domestic hot water, either within the combustion chamber or flue passages, consequently varies over a considerable range. A hot water heating coil positioned in the combustion chamber or flue passages may be designed to furnish an adequate supply of domestic hot water under average operating conditions, but the demands for hot water from the storage tank are so varied and unpredictable that it is difficult to prevent overheating of the water unless thermally actuated accessories are provided. The addition of the latter, however, so add to the initial cost that separate coal, gas, or electric heaters for the domestic hot water supply are used in a large number of installations.

It is an object of my invention to provide an improved system utilizing in conjunction with the heat absorbing hot water heating coil a special heat dissipating coil positioned in the path of the air flow through the furnace for the purpose of limiting the temperature to which the water may be heated under maximum heating conditions. Such maximum heating conditions occur in the coldest weather when the furnace is operating substantially continuously and there is little or no withdrawal of hot water from the domestic hot water storage tank. This second coil, which may be termed a maximum water temperature control coil, has its surface area so proportioned with respect to the area of the heating coil, the storage tank and conduits leading thereto from the heating coil that the water temperature is limited to a safe predetermined maximum value when the furnace is operating continuously under maximum heating conditions. In other words, the contol coil dissipates to the air flowing through the furnace at the desired predetermined maximum water temperature substantially all the heat absorbed by the water heating coil under maximum heating conditions except the small amount which is dissipated by the conduits and storage tank. In case the conduits and tank are well heat insulated their heat dissipation becomes practically negligible.

Placing the control coil in the path of the air flow through the furnace also adds to the overall efficiency of the latter because under maximum heating conditions, substantially all the heat absorbed by the water is dissipated in the air stream. In this manner an adequate supply of hot water is insured under average heating conditions and at the same time any excess heat absorbed by the water contributes to the useful heating effect of the furnace. It is, therefore, another object of my invention to improve the efficiency of a warm air domestic heating furnace by dissipating the surplus heat absorbed by the hot water heating coil in the air stream.

A further advantage resulting from placing a control coil in the path of the air flow through the furnace in accordance with my invention is the elimination, in part at least, of the objectionable blowing of cold air into the space being heated when the furnace burner and forced air circulation blower are started into operation upon a call for heat from the room thermostat controlling operation of the furnace. The control coil, being normally filled with hot water, dissipates heat to the air within the furnace when the operation of the furnace burner and forced circulation blower has been terminated, thus furnishing a supply of warm air immediately available when the furnace burner and blower are again started into operation upon a subsequent call for heat. The control coil not only functions to heat the air while the furnace is inoperative but also acts as an immediately available additional source of heat for air passing thereby on a call for heat by the room thermostat.

While my invention is particularly adapted for use with a warm air domestic heating system operated intermittently under thermostatic control it is not limited, in its broader aspects, to heating systems of this type or to heating systems. It may be used, for example, in hot water domestic heating systems, heating systems using solid fuel burning furnaces and may have other uses wherever a plurality of heat exchange mediums comparable to the air and water of a warm air domestic heating system are heated by a single source of heat.

Other objects and advantages of my invention will become apparent from the ensuing description taken in conjunction with the accompanying drawing in which is set forth for the purpose of illustration the details of the system.

Fig. 1 of the drawing shows an elevation, partially in section, of one embodiment of my invention;

Fig. 2 shows a similar view of a second embodiment of my invention, and

Fig. 3 is a cross section view taken along lines 3—3 of Fig. 2.

Referring to Fig. 1 of the drawing, reference numeral 11 indicates a domestic heating unit of the oil fired warm air type with forced air circulation intermittently or variably operable to supply heat to air passing therethrough under control of a room thermostat indicated schematically in the drawing by the reference character T and to a domestic hot water supply system. The latter consists of the usual thermally insulated storage tank 12 having a pair of conduits 13 and 14 connected to a pair of heat exchange means 15 and 16 located in heat exchange relationship with the combustion chamber 17 and the warm air flowing therethrough to a pair of oppositely disposed air outlets 18 (only one of which is illustrated in the figure), respectively, of the heating unit. The heat exchange means 15 is similar to the usual hot water heating coil employed in furnaces of this and other types. However, it is so proportioned and designed that its surface area bears a certain relation to the surface area of the second heat exchange means 16, the conduits 13 and 14 and the tank 11, as will appear more fully hereinafter. The heat exchange means 16 may be of any well known construction and is illustrated as a coil of the finned type. Storage tank 12 is also provided with a pair of conduits 19 and 20, the former connecting the tank to hot water outlets throughout the building or wherever the heating system is installed and the latter to the water supply main.

The heating unit or warm air furnace structure 11 consists of an air inlet 22 through which a flow of either fresh or recirculated air is induced by a fan 23, operable intermittently under thermal control of either the room thermostat T or, if desired, under the control of a separate thermostat located in the bonnet of the furnace in a manner well known to those skilled in the art. When the room thermostat T calls for heat, the burner unit 30 is started into operation and the air is forced by the fan through a secondary heat exchanger 24 and thence through a chamber 25 surrounding the combustion chamber 17 to the outlets 18. As the air flows over the top of the primary heat exchanger 25 to the outlet 18 it passes by the heat exchange means 16, or control coil as it will be referred to hereinafter. The combustion products from combustion chamber 17 pass through a flue passage 26 to the secondary heat exchanger and thence through a flue connection 27 to the chimney.

The heating unit 11 is provided with the usual burner unit 30 rendered operative intermittently either manually or automatically in response to thermal variations within the building or zone heated. The space 31 of the burner unit is utilized for the various controls, ignition transformer and compressor motor, etc., all of which form part of the usual equipment of a heating unit of this type and which form no part of my invention. The usual control is such that the air heating unit 11 is always operated whenever the room temperature falls below a desired value. In very mild weather operation of the unit at infrequent intervals will supply sufficient heat to maintain the room temperature at the desired value. As the weather becomes colder, the frequency of operation increases until the maximum heat output of unit 11 is obtained by continuous operation thereof. This is the maximum heating condition under which the present invention serves to limit the hot water temperature to a predetermined safe value. This value of water temperature ordinarily is just below the boiling temperature. The value, however, may be lowered if desired to provide a larger factor of safety by increasing the heat dissipating capacity of coil 16 with reference to the heat absorbing capacity of coil 15 under maximum heating conditions.

In Fig. 2, there is illustrated a similar heating unit provided with a combined hot water heating and control device 33. The combined control hot water heating device is formed as a unit possessing two heat exchange portions 34 and 35, the former in heat exchange relationship with the hot combustion products flowing through the flue passage and the latter in heat exchange relationship with the comparatively cool air entering the furnace through inlet 22. The heat exchange portion 35 may be corrugated, as illustrated in Fig. 3, which is a cross section view of the element 33 taken across lines 3—3 of Fig. 2. The areas of the heat exchange portions 34 and 35 are so chosen that they bear a certain relation to each other and to the surface areas of the conduits 13 and 14 and storage tank 12.

In operation the burner 30 and air circulating blower 23 of the heating unit 11 are operated for variable lengths of time depending on the demand for heat by the room thermostat. At certain periods, particularly during extremely cold weather, the unit will be operated practically continuously in order to meet the demand for heat and at other times the heating unit may be operated for only a small percentage of the time. In order to provide an adequate supply of hot water under both extremes of operation, it is necesssary, therefore, that the hot water heating coil 15 be constructed with an area sufficient to provide the required supply of water during those periods when the percentage of time of operation of the heating unit is small. So designed, it is obvious that the water temperature will be increased to an abnormal value such as might generate a dangerous steam pressure under conditions requiring continuous operation of the furnace, provided that no means are provided to limit the water temperature to a predetermined maximum value.

According to my invention the surfaces of the heat exchange means 15 and 16 are so proportioned with respect to each other and conduits 13 and 14 and tank 12 that the temperature of the domestic hot water supply is limited to a predetermined maximum value even though the heating unit be operated continuously. If operated continuously the temperature within the combustion chamber 17 assumes a constant value and likewise the temperature of the air circulated from the rooms around the combustion chamber 17 assumes a substantially constant value. Under this continuous operation condition a certain amount of heat is absorbed by the water. As the water temperature rises when there is little or no withdrawal of water from the storage tank 12 under the continuous operating conditions the amount of heat dissipated from the water to the warm air by the control coil 16 will increase, because of an increased temperature differential between the water and air temperatures, until at a predetermined maximum water temperature the amount of heat dissipated by the control, conduits 13 and 14, and the storage tank 12 will equal the amount of heat absorbed by the water heating coil 15. When these conditions obtain, the water temperature assumes a constant value which is determined by the relative surface areas and heat transfer coefficients of the heat absorbing coil and the heat dissipating coil. In accordance with the present invention, these areas and coefficients are proportioned so that the constant temperature assumed by the water will be under a predetermined limiting temperature at which steam will be formed in the boiler 12. This limiting temperature will, of course, depend upon the water pressure of the tank. It will be understood by those skilled in the art that the heat transfer coefficients of the water heat absorbing element and the water heat dissipating element are determined in common practice by such factors as the material and shape of the surfaces, the velocity of the gases, the temperature differentials and the radiation factors.

It is obvious, therefore, that I have provided an arrangement in which no thermally actuated valves or accessories are required to prevent the water temperature from exceeding a predetermined maximum limit and in which the overall efficiency of the domestic heating and hot water supply system is improved.

The control coil need not be placed in the path of the heated air as illustrated in Fig. 1 and may be placed in the path of the incoming air just as well. Likewise, the hot water heating coil may be placed in contact with the hot products of combustion flowing through the flue passages as well as in the combustion chamber.

The construction illustrated in Fig. 2 operates in exactly the same manner as that illustrated in Fig. 1. In Fig. 2 the heating portion 34 is in heat exchange relation with the products of combustion and the control portion 35 is in heat exchange relation with the incoming air. These portions of unit 33 are analogous to the heat exchange means 15 and 16, respectively; and, therefore, have their surface areas so proportioned to each other and to the areas of the conduits and storage tank that when the furnace is operated continuously the temperature of the domestic hot water supply will not rise above a predetermined value. The principle of operation is the same as that described above in connection with Fig. 1 and will not be discussed at greater length here.

While I have described my invention in conjunction with a domestic heating and hot water system of the warm air type, it is obvious that it has other applications as well. For instance, it may be utilized in a hot water heating system in which case the hot water coil 15 would be positioned in the combustion chamber and the control coil 16 would be positioned in heat exchange relationship with the hot water. In another aspect my invention may be utilized in any system comprising two mediums, both heated intermittently or variably by a single source and one of which is to be maintained below a predetermined maximum temperature.

What I claim as new and desire to secure by Letters Patent of the United States:

1. In a domestic heating and hot water system, the combination of a warm air furnace having a burner and an air circulating blower, means including a room thermostat for starting and stopping operation of said burner and blower, a hot water storage tank subject to variable draw off and provided with a water heating element exposed to the heat of combustion in said furnace and a complementary water temperature limiting element exposed to the air circulated in said furnace and proportioned for transferring substantially all the heat absorbed by said water heating element to the air in said furnace to prevent overheating the water in said tank upon substantially continuous operation of said furnace under the control of said thermostat with substantially no draw off from said tank.

2. In a domestic heating and hot water system, the combination of a warm air furnace having a burner and an air circulating blower, means including a room thermostat for starting and stopping operation of said burner and blower, a hot water storage tank subject to variable draw off, a local water circulating system connected with said tank and including a water heating element exposed to the heat of combustion in said furnace, and a complementary water temperature limiting element exposed to the air circulated in said furnace, the relative exposed surface area and heat transfer coefficients of said elements being proportioned so that upon substantially continuous operation of the furnace under the control of said thermostat and substantially no draw off from said tank, the heat absorbed by said water heating element equals the heat dissipated by said water temperature limiting element.

3. In a domestic heating and hot water system, the combination of a warm air furnace having a burner and an air circulation blower, means including a room thermostat for starting and stopping operation of said burner and blower, a hot water storage tank subject to variable draw off, an auxiliary water tank mounted inside the furnace with one portion thereof in heat exchange relation with the products of combustion of the furnace, and another portion thereof provided with corrugations exposed in heat exchange relation with the air projected into the furnace by said air circulation blower, the said corrugations being proportioned for transferring to the incoming air substantially all of the heat absorbed by the said heat absorbing portion to prevent overheating of the water in said storage tank upon substantially continued operation of the furnace under the control of said thermostat with substantially no draw off from said storage tank.

ROY C. MUIR.